United States Patent [19]

Hurd

[11] Patent Number: 4,463,806

[45] Date of Patent: Aug. 7, 1984

[54] METHOD FOR SURFACTANT WATERFLOODING IN A HIGH BRINE ENVIRONMENT

[75] Inventor: Billy G. Hurd, Dallas, Tex.

[73] Assignee: Mobil Oil Corporation, New York, N.Y.

[21] Appl. No.: 394,238

[22] Filed: Jul. 1, 1982

Related U.S. Application Data

[63] Continuation-in-part of Ser. No. 221,236, Dec. 30, 1980, abandoned.

[30] Foreign Application Priority Data

Aug. 6, 1981 [CA] Canada ................................. 383316

[51] Int. Cl.³ .............................................. E21B 43/22
[52] U.S. Cl. .................................... 166/274; 166/273; 252/8.55 D
[58] Field of Search ...................... 166/273, 274, 275; 252/8.55 D

[56] References Cited

U.S. PATENT DOCUMENTS

| | | | |
|---|---|---|---|
| 3,366,174 | 1/1968 | Ferrell et al. | 166/273 |
| 3,437,140 | 4/1969 | Foster et al. | 166/273 |
| 3,648,773 | 3/1972 | Gogarty | 166/273 |
| 3,792,731 | 2/1974 | Feuerbacher et al. | 252/8.55 D X |
| 3,811,504 | 5/1974 | Flournoy et al. | 166/274 X |
| 3,920,073 | 11/1975 | Holm | 252/8.55 D X |
| 3,938,591 | 2/1976 | Ossip et al. | 166/274 X |
| 3,977,471 | 8/1976 | Gale et al. | 166/273 |
| 4,059,154 | 11/1977 | Braden, Jr. et al. | 166/274 |
| 4,094,708 | 6/1978 | Tate et al. | 166/274 X |
| 4,110,228 | 8/1978 | Tyler et al. | 166/273 X |
| 4,154,301 | 5/1979 | Carlin et al. | 166/273 |
| 4,157,115 | 6/1979 | Kalfoglou | 166/273 X |
| 4,231,427 | 11/1980 | Kalfoglou | 252/8.55 D X |
| 4,270,607 | 6/1981 | Cardenas et al. | 166/274 X |
| 4,316,809 | 2/1982 | Griffith et al. | 252/8.55 D |

*Primary Examiner*—George A. Suchfield
*Attorney, Agent, or Firm*—A. J. McKillop; Michael G. Gilman; J. P. O'Sullivan, Sr.

[57] ABSTRACT

An improved recovery process is provided for fluent petroleum in a porous formation having spaced injection means and production well recovery means which includes a concentrated brine drive and surfactant carrier system. Advantageously, an effective aqueous surfactant composition is formulated containing a water-soluble ether-linked sulfonate surfactant, a cosolvent alcohol, and at least one cosurfactant (as for example, petroleum sulfonate or alkylbenzene sulfonate) or sacrificial sulfonate material in a concentrated brine carrier.

10 Claims, No Drawings

METHOD FOR SURFACTANT WATERFLOODING IN A HIGH BRINE ENVIRONMENT

CROSS REFERENCE TO RELATED APPLICATION

This application is a continuation-in-part of U.S. Application Ser. No. 221,236, filed Dec. 30, 1980, now abandoned, the entire disclosure of which is incorporated herein by reference.

BACKGROUND OF THE INVENTION

1. Field of the Invention

This invention relates to the recovery of petroleum from subterranean oil reservoirs. In particular, it relates to improved waterflooding operations involving the injection of a surfactant slug and drive fluid comprising concentrated brine.

2. Discussion of the Prior Art

In the recovery of oil from oil-bearing reservoirs, it usually is possible to recover only minor portions of the original oil in place by primary recovery methods which utilize only the natural forces present in the reservoir. A variety of supplemental recovery techniques has been employed in order to increase the recovery of oil from subterranean reservoirs. A widely used supplemental recovery technique is waterflooding, which involves the injection of aqueous media into the reservoir. As the water moves through the reservoir, it acts to displace oil therein to a production well system through which the oil is recovered.

Interfacial tension between the injected waterflooding medium and the reservoir oil, the relative mobilities of the reservoir oil and injected media, and the wettability characteristics of the rock surfaces within the reservoir are factors which influence the amount of oil recovered by waterflooding. Thus, it has been proposed to add surfactants to the flood water in order to lower the oil-water interfacial tension and/or alter the wettability characteristics of the reservoir rock. Viscosifiers such as polymeric thickening agents may be added to all or part of the injected water in order to decrease the mobility ratio between the injected water and oil and improve the sweep efficiency of the waterflood.

Techniques involving the injection of an aqueous solution of brine-tolerant sulfonate surfactants have been developed for use under controlled conditions of salinity. Processes which involve the injection of aqueous surfactant solutions have been described in U.S. Pat. Nos. 3,508,612, 3,827,497, 3,890,239, 3,977,471 and 4,018,278, for instance. The surfactant slug may be followed by a thickened water slug which contains a viscosifier such as a water-soluble biopolymer in a graded concentration in order to provide a maximum viscosity greater than the effective viscosity of the flowing oil-water bank and a terminal viscosity near that of water. A driving fluid such as a field brine may be injected with or without the thickener to carry the process to conclusion.

By adding brine-tolerant surfactants to the injected fluids, recovery of the petroleum can be enhanced. However, employing adequate surfactant to substantially enhance the recovery of oil from the subterranean formation by the flooding water has not been generally economically feasible heretofore because the surfactants are adsorbed from the surfactant solution onto the rock surfaces of the subterranean formation. As a result of this adsorption of the surfactant, the concentration of the surfactant in the flooding water becomes less than that required to achieve enhanced recovery of the oil. Moreover, the adsorption, where the surfactant is a mixture, causes a chromatographic dispersion to separate components of the surfactant mixture on the basis of their relative sorptivity. Frequently, this dispersion destroys the efficacy of the surfactant mixture in lowering the interfacial tension between the flooding water and the oil being displaced within the formation.

Brine-tolerant surfactants are generally expensive chemical compositions, and less expensive sacrificial agents can be employed to prevent undue material losses. A surfactant composition has been found which overcomes most of the shortcomings of proprietary combinations. These combinations are not known in the prior art in waterflooding to recover oil from subterranean reservoirs.

SUMMARY OF THE INVENTION

In accordance with the invention, there is provided an improved method of recovering oil from a subterranean formation containing oil having at least one injection well and at least one production well, the improvement comprising the steps of: (1) injecting through an injection well and into said subterranean formation a slug which is an aqueous solution containing high salinity and sufficient of a surfactant combination comprising a preferentially water soluble ether-linked sulfonate or sulfate, a preferentially water soluble petroleum sulfonate and a preferentially oil soluble aliphatic alcohol; (2) injecting through said injection well subsequent to said aqueous solution an aqueous brine drive fluid; and (3) recovering oil from a production well. The surfactant combination, in addition to the two types of sulfonates and the alcohol named, may contain a sacrificial lignosulfonate agent. Also, alkylbenzene sulfonates may be used in place of the petroleum sulfonates. Thus, the invention involves a multi-component surfactant system containing cosurfactants and, preferably, sacrificial agents.

DESCRIPTION OF SPECIFIC EMBODIMENTS

A method is provided for recovering oil from a subterranean formation containing oil and having at least one injection well and at least one production well. The improved technique may include injecting through an injection well and into the subterranean formation an aqueous surfactant solution containing high saline content, i.e., not less than about 3% TDS, and sufficient surfactant to effect an interfacial tension between said aqueous saline surfactant solution and said oil of less than about 0.1 dyne per centimeter. This can be used advantageously with a process in which immediately following the aqueous saline surfactant solution, or subsequently delayed, an aqueous brine drive fluid having initial saline concentration of salt at least 75% of the surfactant salinity concentration is injected. Sufficient additional drive fluid is injected for recovering oil from a production well.

In one aspect of the present invention, there is provided a new and improved waterflooding process employing a surfactant solution in highly saline brine comprising an alcohol and surfactant which exhibit contrasting oil-water solubility preferences. In carrying out the invention, at least a portion of the fluid introduced into the oil reservoir via a suitable injection system is an aqueous liquid containing a preferentially oil-soluble alcohol of limited water solubility and a preferentially water-soluble anionic surfactant comprising a petroleum sulfonate and a hydrocarbyl ether-linked sulfonate or sulfate wherein the hydrocarbyl group provides a lipophilic surfactant base and wherein the ether linkage is provided by an alkoxy linkage having a ratio of carbon atoms to oxygen atoms within the range of 2 to 3. In a preferred embodiment of the invention, the preferentially oil-soluble alcohol is an aliphatic alcohol containing from 5 to 7 carbon atoms, particularly a saturated alcohol and, most especially, a saturated primary alcohol, i.e. n-pentanol, n-hexanol and n-heptanol. Preferred ether-linked surfactants for use in highly saline solutions are sulfonated polyethoxylated aliphatic alcohols having 2 to 4 ethylene oxide units and in which the aliphatic group providing the lipophilic base contains from 16 to 18 carbon atoms. Preferred petroleum sulfonate surfactants have a relatively low average equivalent weight, e.g., about 350 or less.

The ether linkage of the anionic ether-linked sulfates or sulfonates employed in carrying out the present invention with highly-saline water preferably is provided by an alkoxylated group derived from ethylene oxide or propylene oxide or mixture of ethylene oxide and propylene oxide. The number of alkoxy groups in the ether linkage will vary depending upon such factors as the character of the lipophilic surfactant base and the salinity of the aqueous surfactant solution, but normally the ether linkage will contain from 1 to 20 alkylene oxide units.

Ether-linked sulfonates exhibit better thermal stability than sulfate derivatives and a preferred ether-linked sulfonate for use in carrying out the present invention is characterized by the formula:

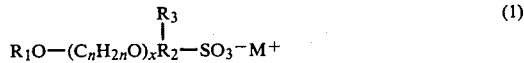

$$R_1O-(C_nH_{2n}O)_xR_2-SO_3^-M^+ \quad (1)$$

wherein $R_1$ is a lipophilic base provided by a $C_8$ to $C_{22}$ aliphatic group or an aliphatic substituted aryl group containing from 5 to 24 aliphatic carbon atoms with at least one aliphatic substituent containing at least 5 carbon atoms, n is 2 or 3, x is a number within the range of 1 to 20, $R_2$ is a $C_1$ to $C_4$ alkane group, $R_3$ is a hydrogen, a hydroxy group or a methyl group, and M is an alkali metal or nitrogenous base.

The sulfate useful herein has the formula:

$$R_1O-(C_nH_{2n}O)_x-SO_3^-M^+ \quad (2)$$

wherein $R_1$, n, x and M have the same meaning.

In this description, parts by weight and metric units are employed, unless otherwise stated. Although significant variations in surfactant compositions are set forth, common components include the following:

The ether-linked surfactant used was a reaction product of propane sultone and a sodated commercial ethoxylated $C_9$ alkyl phenol known as "Igepal CO430" (GAF Corp.). This surfactant, identified in the following Table as "CO 430 PS", has the following structural formula:

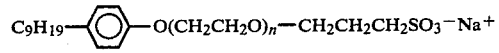

$$C_9H_{19}-\underset{}{\bigcirc}-O(CH_2CH_2O)_n-CH_2CH_2CH_2SO_3^-Na^+$$

where n averages 4.

The standard petroleum sulfonate used herein is "TRS-40" (Witco Chem. Corp.), and the amounts given herein refer to active sulfonate material in the commercial product, which also contains oil and water along with the 40-43% active material. This petroleum sulfonate has an average equivalent weight of about 342. The cosolvent aliphatic alcohol preferred herein is n-hexanol. Lignosulfonate is employed optionally and is identified as "ERA-5" (American Can Co.). The "PS 420" is a petroleum sulfonate with a molecular weight of about 420.

Standardized laboratory oil displacement tests are performed with regard to crude oil employing elongated flow tubes. In each standard run, the tube is packed with unconsolidated Berea sand and then saturated with saline water. The crude oil is then flooded into the tube until the effluent is water free. The total amount of water displaced from the tube during this operation is measured to determine initial oil saturation. Each tube is subjected to a simulated waterflood by injecting a brine until the effluent is free of oil. The amount of oil produced during this operation is measured in order to determine the residual oil saturation after waterflood of the tube. A simulated surfactant waterflood is then carried out by injecting an aqueous surfactant slug followed by injection of a driving fluid until the effluent from the tube is free of oil. A constant flow rate is maintained equivalent to an advance rate of about 2 meters per day (6.6 ft./day). The amount of oil recovered during this operation is measured in order to determine recovery efficiency. Unless otherwise noted, water used in the initial water saturation step, the simulated waterflood, the surfactant slug, and the drive fluid is a mixed brine containing 16.6 weight percent total dissolved solids, dominantly NaCl with 1.2% Ca+Mg. Surfactant slugs were typically driven by the appropriate brine containing 0.1 wt. % Kelzan, which solution has a viscosity of about 45 centipoises (cp) at 76° F., the temperature employed for tests unless otherwise stated. The polymer used is the anionic polysaccharide B-1459 produced by fermentation of glucose with the bacterium *Xamthomonas campestris* (NRRL B-1459 USDA) which is available from the Kelco Company under the trade name "Kelzan".

TABLE 1

| Example | PV | Component | % Act | TOR % WFRO | Final S or % PV |
|---|---|---|---|---|---|
| 1 | 0.106 | CO 430 PS | 2.0 | | |
|  |  | PS 420 | 2.0 | | |
|  |  | n-hexnol | 0.3 | | |
|  | 0.176 | ERA-5 | 2.0 | 45.7 | 12.7 |
| 2 | 0.106 | CO 430 PS | 2.0 | | |
|  |  | TRS-40 | 2.0 | | |
|  |  | n-hexanol | 0.7 | | |
|  | 0.176 | ERA-5 | 2.0 | 98.8 | 0.3 |
| 3 | 0.107 | CO 430 PS | 1.0 | | |
|  |  | TRS-40 | 1.0 | | |
|  |  | n-hexanol | 0.35 | | |
|  | 0.178 | ERA-5 | 2.0 | 65.1 | 7.9 |
| 4 | 0.141 | CO 430 PS | 1.0 | | |
|  |  | Petroleum sulfonate* | 1.0 | | |
|  |  | n-hexanol | 0.35 | | |
|  | 0.177 | ERA-5 | 2.0 | 59.3 | 9.8 |

TABLE 1-continued

| Example | PV | Component | % Act | TOR % WFRO | Final S or % PV |
|---|---|---|---|---|---|
| 5 | 0.142 | CO 430 PS | 1.0 | | |
| | | Petroleum sulfonate* | 1.0 | | |
| | | n-hexanol | 0.45 | | |
| | 0.179 | ERA-5 | 2.0 | 57.1 | 10.4 |
| 6 | 0.107 | CO 430 PS | 1.0 | | |
| | | TRS-40 | 1.0 | | |
| | | n-hexanol | 0.35 | | |
| | | ERA-5 | 1.0 | 52.4 | 11.2 |
| 7 | 0.071 | CO 430 PS | 0.882 | | |
| | | TRS-40 | 0.882 | | |
| | | n-hexanol | 0.31 | | |
| | | ERA-5 | 5.2 | | |
| Drive | | 0.1% Kelzan** | | 56.1 | 10.4 |

*A sodium petroleum sulfonate typically containing about: 6% Na; 10% S; 16% H$_2$O; 9-10% oil; 2% NA$_2$SO$_4$; 0.03% NAOH; and a base number of about 0.5. Percentages are by weight.
**In water containing a total of 0.07% by wt. of Ca$^{++}$ and Mg$^{++}$ salts (1% TDS). Concentrations of n-hexanol shown in Column 4 are volume percent.

A surprising result is the superiority of a preferentially water soluble, low equivalent petroleum sulfonate over a more oil soluble, higher equivalent weight petroleum sulfonate in the three component formulations.

TRS-40 is a green acid (water soluble fraction) petroleum sulfonate obtained in the manufacturing of white oils. Petrostep 420 is obtained by direct sulfonation of a petroleum fraction and contains both oil soluble and water soluble sulfonate components.

Accordingly, a preferred embodiment of the invention involves the use of a preferentially water soluble petroleum sulfonate as essentially all of the petroleum sulfonate component of the surfactant slug.

Water solubility of directly linked anionic surfactants, such as petroleum sulfonates, is ordinarily adversely affected by increasing salinity with the result that surfactant precipitation occurs at moderate monovalent salt concentrations and in the presence of even smaller amounts of divalent metal salts. The ether-linked anionic surfactants tolerate much higher salinities since the water soluble ether moiety is affected by dissolved salts to a lesser degree than the anionic hydrophilic group. The sulfonate derivatives are much more stable in high temperature environments. Therefore, the use of the sulfonate derivatives is preferred in carrying out the present invention, particularly where the temperature of the reservoir to be flooded is about 50° C. or above.

The sulfonate or sulfate anionic group may be linked to any suitable hydrocarbon group which provides a lipophilic base of the surfactant. Thus, the lipophilic base of the anionic ether-linked sulfates or sulfonates employed in the present invention may be provided by aliphatic groups or aliphatic substituted aryl groups. Where the lipophilic base is provided by an aliphatic substituted aryl group, the aryl component may be mononuclear (benzene) or dinuclear (naphthalene) and contain one or more aliphatic substituents. Preferably the aryl component will be mononuclear in view of the practical consideration of economy and product availability. The aryl group is substituted with one or more aliphatic groups, at least one of which has 5 or more carbon atoms with the total number of aliphatic carbon atoms being within the range of 5-24. Where the lipophilic base is provided by an aliphatic radical, it should contain from 8 to 22 carbon atoms. The aliphatic groups or aliphatic substituents may be unsaturated and/or contain branched chains or may take the form of normal alkyl radicals. Where M is an alkali metal ion, it may be sodium or potassium. Various nitrogenous bases, including ammonium or quaternary amines, may be employed. Representative alkylammonium ions include methylammonium, ethylammonium, and normal or isopropylammonium ions, and examples of alkanolammonium ions include monoethanolammonium and triethanolammonium ions.

Preferably the ether linkage is provided by one or more ethylene oxide groups because of the increased water solubility imparted to the molecule. Thus, in a preferred form of surfactant characterized by formula (1), n is 2 and x is a number within the range of 1 to 6. In the case where $R_1$ is an aliphatic group, it preferably contains from 12 to 20 carbon atoms. In the case where $R_1$ is an aliphatic substituted aryl group, the aliphatic substituents preferably contain from 9 to 18 carbon atoms. In this instance, as noted previously, it is desirable that a mononuclear aryl radical such as benzene, toluene, or xylene be employed. As indicated by the formula, the alkylene group connecting the sulfonate group with the ether linkage is provided by a $C_1$ to $C_4$ alkylene group which may be unsubstituted or which may be substituted by a hydroxy group or a methyl group. Preferably, however, the alkylene linkage is provided by an ethylene or propylene group which is unsubstituted or substituted by a hydroxy group. That is, $R_2$ contains 2 to 3 carbon atoms and $R_3$ is a hydrogen atom or hydroxy group. It is known that many surfactant waterflooding processes are specifically designed for the reservoirs to which they are applied. This specificity depends upon a number of factors including the composition of the reservoir oil, the ionic character of the reservoir water and the water used in formulating the injected surfactant solution, and the reservoir temperature. The HLB of the surfactant which is most effective in the recovery of oil from a particular reservoir depends to some extent upon the ionic strength of the injected water and the connate water within the reservoir. Generally as the salinity increases, due to the presence of monovalent salts such as sodium chloride or divalent salts such as calcium chloride or magnesium chloride, the HLB at which the most efficient oil recovery is achieved likewise increases.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al, incorporated herein by reference. The term "pore volume" as used herein is defined by that volume of the portion of the formation underlying the well pattern employed, as described in greater detail in the Burdyn et al patent.

The present invention may be carried out in conjunction with the use of a thickening agent added for mobility control purposes. The thickening agent may be added to the aqueous solution of alcohol and surfactant or it may be injected in a separate mobility control slug. Where a separate mobility control slug is employed, it normally will be injected immediately after the slug containing the surfactant. The thickening agent may be added in concentrations so as to provide a graded viscosity at the trailing edge of the mobility control slug. Use of graded viscosities at both the leading and trailing edges of the mobility control slug is disclosed in U.S. Pat. No. 4,018,281 to Chang. Alternatively, the thickening agent concentration may be relatively constant throughout. Normally, the viscosity of at least a portion of the mobility control slug should be at least as great as the effective maximum viscosity of the oil/water bank it displaces or typically it will be within the range of about 1 to 9 times the viscosity of the reservoir oil. Various thickening agents which may be employed for mobility control purposes are well known to those skilled in the art and include such polymers as the biopolymer "Kelzan", previously identified, and the various partially hydrolyzed polyacrylamides available from the Dow Chemical Company under the trade name "Pusher" chemicals.

The ether-linked surfactant, petroleum or alkylbenzene sulfonate and alcohol may be present in the aqueous liquid in any suitable concentration depending upon the characteristics of the particular reservoir involved and such factors as surfactant consumption, e.g. by adsorption, and dispersion of the surfactant into the reservoir water. The total surfactant concentration may range from 0.01 to 15 weight percent although in most applications the total surfactant will be employed in a concentration within the range of 0.1 to 5 weight percent. The alcohol concentration will, of course, depend upon the concentrations of the surfactant, cosurfactant and the desired ratio of surfactant to cosolvent. If a sacrificial agent, such as a lignosulfonate is employed, its concentration in the surfactant slug may be within the range of from about 1% to about 10% by weight. The aqueous surfactant slug may be injected in amounts ranging from 0.02 to 3.0 pore volumes with the larger pore volume amounts being used with the lower surfactant concentrations. Usually it will be desired to inject the alcohol surfactant solution in an amount within the range of 0.05 to 2.0 pore volumes.

I claim:

1. In an improved method of recovering oil from a subterranean formation containing oil having at least one injection well and at least one production well, the improvement comprising the steps of:
    (1) injecting through an injection well and into said subterranean formation a slug which is an aqueous solution containing high salinity and sufficient of a surfactant combination comprising a preferentially water soluble ether-linked sulfonate or sulfate, of one of the formulae:

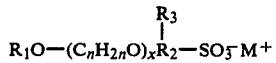

and

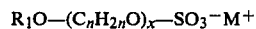

wherein $R_1$ is a lipophilic base provided by a $C_8$ to $C_{22}$ aliphatic group or an aliphatic substituted aryl group containing from 5 to 24 aliphatic carbon atoms with at least one aliphatic substituent containing at least 5 carbon atoms, n is 2 or 3, x is a number within the range of 1 to 20, $R_2$ is a $C_1$ to $C_4$ alkane group, $R_3$ is a hydrogen, a hydroxy group or a methyl group and M is an alkali metal or nitrogenous base;

a petroleum sulfonate and a preferentially oil soluble aliphatic alcohol, having 5 to 7 carbon atoms, wherein essentially all of the petroleum sulfonate which is present in said slug is preferentially water soluble;

(2) injecting through said injection well subsequent to said aqueous solution an aqueous brine drive fluid; and (3) recovering oil from a production well.

2. The method of claim 1 wherein the surfactant comprises a water-soluble ether-linked sulfonate, and the brine drive fluid has an initial saline concentration of salt at least 75% of the salinity of the surfactant solution.

3. The method of claim 2 wherein said petroleum sulfonate has an average equivalent weight of about 350 or less.

4. The method of claim 3 wherein the surfactant solution comprises at least one sacrificial agent.

5. The method of claim 4 wherein the sacrificial agent is a lignosulfonate.

6. The method of claim 3 wherein said preferentially oil soluble aliphatic alcohol is a saturated alcohol having 5 to 7 carbon atoms.

7. The method of claim 3 wherein said alcohol contains from 5 to 7 carbon atoms.

8. The method of claim 7 wherein said alcohol is n-hexanol.

9. The method of claim 1 wherein the ether-linked sulfonate has the formula:

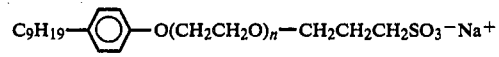

wherein n averages 4.

10. The method of claim 9 wherein the surfactant-containing brine contains a sacrificial lignosulfonate, a petroleum sulfonate and n-hexanol.

* * * * *